Figure 1:
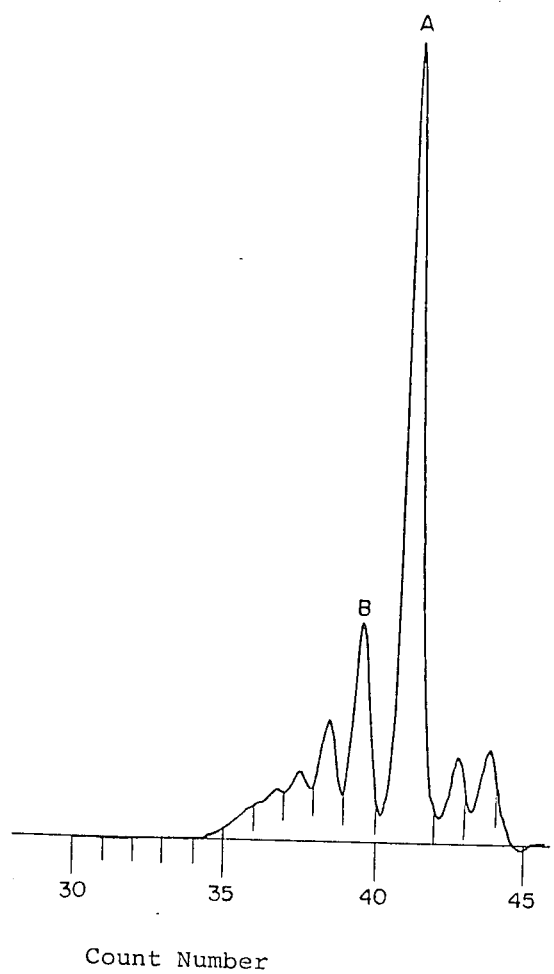

United States Patent [19]

Sano et al.

[11] Patent Number: 4,474,942

[45] Date of Patent: Oct. 2, 1984

[54] CROSS-LINKED POLYESTERAMIDE FROM BIS(2-OXAZOLINE)

[75] Inventors: Yasuo Sano, Minoo; Kazuhiro Arita, Takatsuki; Isao Masuda, Nishinomiya, all of Japan

[73] Assignee: Takeda Chemical Industries, Ltd., Osaka, Japan

[21] Appl. No.: 504,781

[22] Filed: Jun. 16, 1983

[30] Foreign Application Priority Data

Jun. 28, 1982 [JP] Japan .................................. 57-112334
Oct. 12, 1982 [JP] Japan .................................. 57-179636
Apr. 28, 1983 [JP] Japan .................................. 58-75914

[51] Int. Cl.$^3$ .............................................. C08G 69/44
[52] U.S. Cl. ..................................... 528/363; 524/606;
525/419; 528/288; 528/335; 528/336
[58] Field of Search ............... 528/363, 335, 336, 288;
524/606; 525/419

[56] References Cited

FOREIGN PATENT DOCUMENTS 36-636896 12/1961 Japan .
47-00618 1/1972 Japan .

OTHER PUBLICATIONS

Patentschrift 1050 540 (DBP 1050540)–Jaeger.
Polymer Letters, vol. 4, pp. 257–260 (1966).

*Primary Examiner*—Harold D. Anderson
*Attorney, Agent, or Firm*—Wenderoth, Lind & Ponack

[57] ABSTRACT

A new cross-linked polyester amide having structure in which the ester amide chain of the formula below:

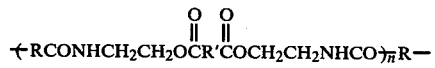

(wherein R and R' each are a bivalent hydrocarbon radical; n is a positive integer) as obtained by the reaction of a bis(2-oxazoline) compound and a dicarboxylic acid is contained in the polymer chain and at least 5% of its —NH— group is cross-linked with a 2-oxazoline ring by ring-opening addition reaction.

The cross-linked polyesteramide is tough and excels in abrasion resistance and solvent resistance and can be utilized in the molding of machinery parts such as rolls and gears and embedded molding of electrical machinery and apparatus parts as well as for electric insulating materials and materials for dental uses.

The resin composition comprising the said cross-linked polyesteramide and about 3 to 95 weight % of reinforcements and/or fillers can provide the molding material having excellent mechanical properties, especially outstanding toughness, that cannot possibly be expected with conventional fiber-reinforced plastics and also exhibiting superior characteristics such as thermal properties.

The resin composition can be utilized not only in the application fields for conventional fiber-reinforced plastics but also in the new application areas where conventional fiber-reinforced plastics have failed to achieve application development.

14 Claims, 1 Drawing Figure

CROSS-LINKED POLYESTERAMIDE FROM BIS(2-OXAZOLINE)

This invention relates to novel cross-linked polyesteramides and production thereof.

It has been well known that mixing at the approximately equimolar ratio of bis(2-oxazoline) compounds with dicarboxylic acids, followed by heating, produces linear polyesteramides.

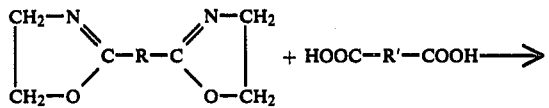

Bis(2-oxazoline) compound    Dicarboxylic acid

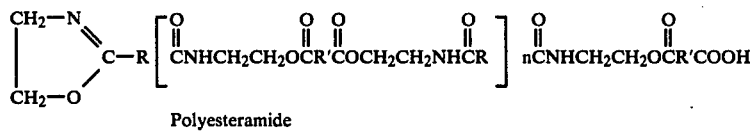

Polyesteramide

Nevertheless, detailed investigation conducted by the present inventors on the above-described reaction led to the finding that continued reaction for a prolonged period of time or use of a bis(2-oxazoline) compound in excess over that of the dicarboxylic acid brings about the hitherto entirely unknown reaction of ring-opening addition of an oxazoline ring to the once formed amide linkage as illustrated in the chemical equation below:

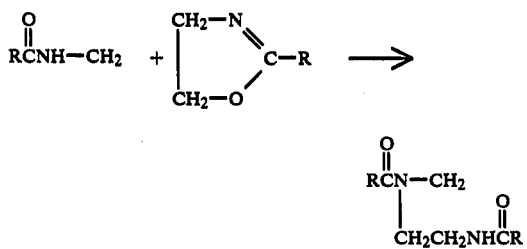

By taking advantage of the reaction between the amide group and oxazoline ring, cross-linked polyesteramides are supposed to be obtained from bis(2-oxazoline) compounds and dicarboxylic acids.

The present inventors carried out further extensive investigation into the above reaction, and as a result, found that cross-linked polyesteramides can be obtained by mixing a bis(2-oxazoline) compound with a dicarboxylic acid in the proportions of not more than about 1 mole of dicarboxylic acid against 1 mole of bis(2-oxazoline) compound, purging the inside of the system completely with nitrogen and heating the mixture at temperatures of not less than 180° C. After intensive investigation of the catalyst acting to accelerate selectively the reaction between the amide group and oxazoline ring, furthermore, the present inventors found that electrophilic reagents such as phosphorous acid esters, phosphonous acid esters and inorganic salts exhibit catalytic action and that the use of such catalysts can produce cross-linked polyesteramides with a particularly high degree of cross-linking. These findings have culminated in this invention.

Thus, this invention covers (1) cross-linked polyesteramides having a structure in which the ester amide chain of the formula below:

$$-(-RCONHCH_2CH_2OCR'COCH_2CH_2NHCO-)_{\overline{n}}R-$$

[wherein R and R' each are a bivalent hydrocarbon radical; n is a positive integer] as obtained by the reaction of a bis(2-oxazoline) compound with a dicarboxylic acid is contained in the polymer chain and at least 5% of its —NH— group is cross-linked with a 2-oxazoline ring by ring opening addition reaction, (2) processes for producing the said cross-linked polyesteramides and (3) resin compositions comprising the said cross-linked polyesteramides and about 3 to 95 weight % of reinforcements and/or fillers.

In the above formula, as the hydrocarbon radical represented by R or R', there may be mentioned aliphatic groups, aromatic groups and the like to be described later. n is an integer of 1 to about 60.

The cross-linked polyesteramides of this invention possess a structure in which NH of the amide groups in the polyesteramide chain resulting from the reaction of a bis(2-oxazoline) compound with a dicarboxylic acid reacts further with an oxazoline ring to form a trifurcate bond at N. That is, the reaction of NH of the amide group with an oxazoline ring produces the trifurcate bond. That the cross-linked polyesteramides of this invention possess such structure can be ascertained by the procedure which comprises heating the cross-linked polyesteramide in an aqueous alkali solution to completely hydrolyze the ester and amide linkages, and separating the decomposition product into its components to subject to suitable means such as nuclear magnetic resonance, gas chromatography, gel permeation chromatography and thin-layer chromatography. Especially, analysis for amine components indicates that there are contained, in addition to monoethanolamine, compounds having the structure of $H_2N-(CH_2CH_2NH)_nCH_2CH_2OH$ (where n is an integer of 1, 2, ...). The presence of the latter demonstrates the cross-linking structure of the polyesteramides of this invention (refer to the figure shown below).

An example of the partial structure (the dotted lines indicate the sites where hydrolysis takes place):

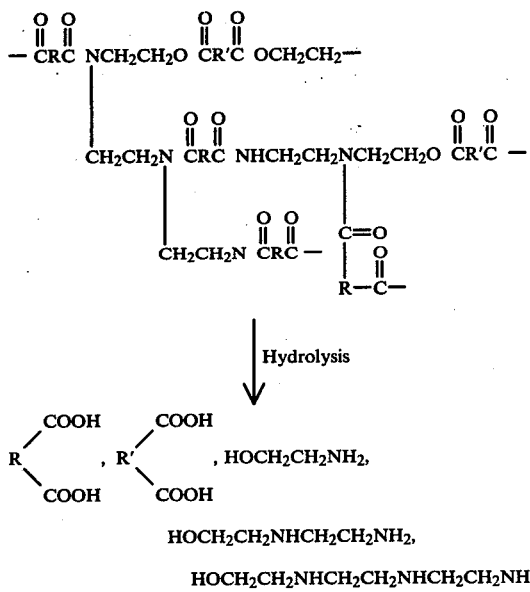

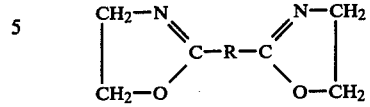

Since it is practically impossible to determine quantitatively individual polyethylenepolyamines having a hydroxyl group at their terminal (HO—(CH₂CH₂NH)ₙCH₂CH₂NH₂), the whole structure of the cross-linked polyesteramide cannot be determined in detail. But, the degree of cross-linking can be roughly expressed by:

$$\alpha = 100 - \frac{[\text{No. of moles of monoethanol amine}]}{[\text{No. of moles of bis(2-oxazoline)}] \times 2} \times 100$$

$$= 100\left(1 - \frac{[\text{No. of moles of monoethanolamine}]}{[\text{No. of moles of R'(COOH)}_2]}\right)$$

In the above expression, the term:

$$\frac{\text{No. of moles of monoethanolamine}}{[\text{No. of moles of bis(2-oxazoline)}] \times 2} \times 100$$

can be referred to as "residual rate of monoethanolamine".

The cross-linked polyesteramides of this invention show the degree of cross-linking, α, of at least 5%, preferably in the range of about 15 to 75%.

The said cross-linked polyesteramides are manufactured by the following procedure.

They are obtained by mixing A moles of a bis(2-oxazoline) compound with B moles of a dicarboxylic acid (B≦A) in combination with a catalyst (an electrophilic reagent) and heating the mixture at temperatures of not lower than about 100° C., preferably not lower than about 150° C.

As the bis(2-oxazoline) compounds which are usable in this invention, there may be mentioned compounds having the oxazoline rings bonded to alkyl chains as represented by the general formula below, such as 1,2-bis(2-oxazolinyl-2)ethane, 1,4-bis(2-oxazolinyl-2)butane, 1,6-bis(2-oxazolinyl-2)hexane, 1,8-bis(2-oxazolinyl-2)octane and 1,4-bis(2-oxazolinyl-2)cyclohexane and compounds having two oxazoline rings bonded to the aromatic nucelus as represented by the general formula below, such as 1,2-bis(2-oxazolinyl-2)benzene, 1,3-bis(2-oxazolinyl-2)benzene, 1,4-bis(2-oxazolinyl-2)benzene and 2,2'-bis(2-oxazoline) and others.

[wherein R is a bivalent hydrocarbon radical.]

As the dicarboxylic acids, use can be made of aliphatic dicarboxylic acids, such as malonic acid, succinic acid, glutaric acid, adipic acid, pimelic acid, suberic acid, azelaic acid, sebacic acid, dodecandioic acid, dimer acid, eicosandioic acid and thiodipropionic acid, and aromatic acids which are fusible on mixing under heating with a bis(2-oxazoline) compound, such as phthalic acid, naphthalenedicarboxylic acid, diphenylsulfonedicarboxylic acid and diphenylmethanedicarboxylic acid. These may be used as mixtures of not less than two kinds.

Examples of the dicarboxylic acids which are usable include dicarboxylic acids having carboxylic acids in the side chain of the aromatic ring such as bis(carboxymethoxyphenyl)dimethylmethane and bis(carboxymethoxyphenyl)sulfone. These may be used as mixtures of not less than two kinds thereof.

The amount of the dicarboxylic acid is not more than about 1 mole against 1 mole of the bis(2-oxazoline) compound, preferably in the range of about 1 to 0.2 mole.

As the effective catalyst, there may be mentioned electrophilic reagents such as phosphorous acid esters, esters of organic phosphonous acids and inorganic salts. Out of these three kinds of compounds, phosphorous acid esters are the most preferred in terms of three points of the catalytic capacity, solubility toward the system and auxiliary effect.

As the phosphorous acid esters which are employable as catalyst, there may be mentioned diesters and triesters such as triphenyl phosphite, tris(nonylphenyl) phosphite, triethyl phosphite, tri-n-butyl phosphite, tris(2-ethylhexyl) phosphite, tristearyl phosphite, diphenylmonodecyl phosphite, tetraphenyl dipropylene glycol diphosphite, tetraphenyltetra(tridecyl)pentaerythritol tetraphosphite, diphenyl phosphite, 4,4'-butylidenebis(3-methyl-6-t-butylphenyl-di-tridecyl) phosphite and bisphenol-A pentaerythritol phosphite. Two or more of these catalysts may be used.

Among the above compounds, the phosphorous acid esters containing phenolate or substituted phenolate groups are particularly preferred.

Examples of the ester of organic phosphonous acid include esters of aliphatic or aromatic phosphonous acid, such as diphenyl phenylphosphonite, di(β-chloroethyl) β-chloroethylphosphonite and tetrakis(2,4-di-t-butylphenyl) 4,4'-diphenylenediphosphonite.

Effective as the inorganic salts are various salts which are soluble in the system. Salts not having water of crystallization are preferred. Such salts include salts which are made up of combinations of monovalent to tetravalent cations (inclusive of polyatomic cations such as vanadium and zirconium) such as lithium, potassium, sodium, magnesium, calcium, titanium, zirconium, vanadium, chromium, manganese, iron, cobalt, nickel, copper, zinc, cadmium, aluminum, tin and cerium with anions such as halide, nitrate, sulfate and chlorate. Among others, cupric chloride, vanadium chloride, vanadyl chloride, cobalt nitrate, zinc chloride, manganese chloride and bismuth chloride exhibit excellent catalytic capability.

The amount of the catalyst is not less than about 0.05 weight % against starting resin material, preferably not less than about 0.2 weight %.

Although the bis(2-oxazoline) compound and dicarboxylic acid may be mixed from the beginning, it is possible to warm each of them and then mix both at increased temperatures.

In addition, the liquid reaction mixture, which was prepared by mixing the bis(2-oxazoline) compound with the dicarboxylic acid in a ratio of not more than about 0.7 mole, preferably about 0.15 to 0.40 mole against 1 mole of the bis(2-oxazoline) compound and by melting the mixture at a temperature of not lower than about 50° C., preferably about 120° to 180° C., may be added to another liquid reaction mixture. The latter liquid reaction mixture was prepared by mixing the same or different bis(2-oxazoline) compound with the same or different dicarboxylic acid in a ratio of not more than about 0.7 mole, preferably about 0.20 to 0.55 mole against 1 mole of the dicarboxylic acid and by melting the mixture at a temperature mentioned above. The molar ratio of the dicarboxylic acid in respect to the bis(2-oxazoline) compound becomes not more than 1.

In this case, there are such merits that the above two liquid reaction mixtures have relatively low viscosities and are quite stable for a long time. With regard to the addition of the catalyst, there may be mentioned three procedures of (1) mixing from the beginning, (2) mixing in the course of warming and (3) admixing in advance with either the bis(2-oxazoline) compound or the dicarboxylic acid, and any means of these may be adopted.

The reaction temperature is not lower than about 100° C., preferably in the range of about 150° to 250° C.

The reaction time, which varies with the type and amount of the catalyst, the kind of the bis(2-oxazoline) compound and dicarboxylic acid, etc. and cannot unconditionally be specified, is normally in the range of about 2 minutes to 1 hour.

The cross-linked polyesteramides according to this invention, having the ester, secondary amide and tertiary amide groups in the molecule, are tough and excel in abrasion resistance and solvent resistance. In addition, there can be obtained cross-linked polyesteramides provided with a fairly wide range of physical properties by varying suitably the type of raw materials, the molar ratio of bis(2-oxazoline) compound to dicarboxylic acid and the kind and amount of catalyst. Such cross-linked polyesteramides can be utilized in the molding of machinery parts such as rolls and gears and embedded molding of electrical machinery and apparatus parts as well as for electric insulating materials and materials for dental uses.

The above cross-linked polyesteramides are prepared by the use of a bis(2-oxazoline) compound and a dicarboxylic acid as the starting materials to produce a linear polyesteramide having —NHCO— group(s) and —COO— group(s) as an intermediate product.

In this invention, instead of the above intermediate product, a linear polymer having —NHCO— group(s) in the molecule (polyamide) may be used. Its specific examples include aliphatic nylons such as homopolymer nylons being exemplified by nylon 6, nylon 11, nylon 12, nylon 6,6, nylon 6,10, nylon 6,12, etc. or copolymer nylons being typified by nylons 6/6, 6,6/10, nylon 6/12, etc., and aromatic nylons being exemplified by polymers from xylylenediamine and adipic acid, etc.

Also, it may be polymers obtained by the reaction of dimer acid with various diamines, which are referred to as dimer-acid based polyamides.

In addition, it may be polyamide imides obtained by the reaction of aromatic diamines with aromatic tetracarboxylic dianhydrides. As examples of the aromatic diamines which are used for this purpose, there may be mentioned 4,4'-diaminodiphenylpropane, 4,4'-diaminodiphenylmethane, 4,4'-diaminodiphenyl ether, 3,3'-diaminodiphenylsulfone, 1,5-naphthalenediamine and meta-phenylenediamine, and examples of the aromatic tetracarboxylic dianhydrides include pyromellitic dianhydride, 3,3'-, 4,4'-benzophenonetetracarboxylic dianhydride, bis-(3,4-dicarboxyphenyl)ether dianhydride, bis-(3,4-dicarboxyphenyl)sulfone dianhydride and 1,2,4,5-naphthalenetetracarboxylic dianhydride. Moreover, it may be polymers obtained by the anionic polymerization of monomers capable of reacting to yield linear polymers such as ε-caprolactam. The above-mentioned linear polymers may be either polymers with high molecular weight or oligomers with low molecular weight. Out of the linear polymers having the amide linkage, nylons such as aliphatic nylons and copolymer nylons and polymers derived from the reaction of dimer acid with diamines such as dimer-acid based polyamides are particularly preferred.

Examples of these compounds, which are used for cross-linking the above polyamides or polyamide imides, are those having not less than two 2-oxazolin-2-yl groups in their molecules, include monomers such as bis(2-oxazoline) compounds mentioned above, and oligomers and polymers having 2-oxazolin-2-yl groups at the terminals.

The oligomers or polymers having 2-oxazolin-2-yl groups at the terminals are obtained by the procedure to be described below. For example, a polyester amide is obtained easily by the reaction of a polycarboxylic acid with bisoxazoline, whereby the use of the oxazolinyl group in excess over the acid group yields a polyester amide having the oxazoline rings at the terminals. By varying the types, number of functional groups and used amounts of the acid and oxazoline utilized, there are easily obtained compounds having various molecular weights and functional groups.

Also, the oligomers and polymers having not less than two 2-oxazolin-2-yl groups are obtained by the reaction of an acid-terminated oligomer or polymer with a bis(2-oxazoline) compound. Examples of the acid-terminated compound which is used for this purpose, include acid-terminated butadiene oligomers, acid-terminated acrylonitrile-butadiene oligomers, acid-terminated polyesters, etc.

Cross-linked amide polymers are obtained by mixing a linear polymer having —NHCO— group(s) with a compound having not less than two 2-oxazolin-2-yl groups in the molecule, followed by heating.

Generally, many of the linear polymers having the amide linkage and compound having not less than two 2-oxazolin-2-yl groups in the molecule assume a solid form. In such cases, for example, the two components may be simultaneously weighed, and then mixed, in a vessel maintained at not higher than the temperature where the reaction does not take place, or each of the components may be successively added while they are dissolved or may be molten in advance in separate vessels and then mixed. In cases in which either of the components shows high softening point and melting point and is liable to gel, it may be dissolved in a solvent and then subjected to mixing by removing the solvent. The amount of the compound having not less than two 2-oxazolin-2-yl groups in the molecule to be used against the linear polymer having —NHCO— group(s) may be of any magnitude, only if it exceeds the amount required for the cross-linking of the amide linkages of the linear polymer, and arbitrary amount is employed depending upon the desired physical properties.

Normally, its proportion is not less than about 0.5 weight % against the linear polymer having —NHCO— group(s), preferably not less than about 1 weight %.

It is preferred to use for example the catalysts mentioned above in carrying out the aforementioned reaction under heating, because they accelerate the cross-linking.

The amount of the catalyst is about not less than about 0.05 weight % against the total amount of the above two components, preferably not less than about 0.2 weight %.

The reaction temperature may be those in excess of the temperature at which the cross-linking reaction proceeds, and is preferably in the range of about 150° C. to 220° C. The curing time varies depending upon the type and amount ratio of the above-mentioned two components, curing temperature, kind and amount of catalysts, etc., and curing can be effected, in some instances, within the range of several ten seconds.

The cross-linked amide polymer according to this invention exhibits enhanced mechanical strength and adhesion performance and also excels in heat resistance and chemical resistance. Cross-linked polymers having a widened range of properties can be formed by varying suitably the types and amount ratio of linear polymer having —NHCO— group(s) and compound having not less than two 2-oxazolin-2-yl groups in the molecule. Such cross-linked amide polymers, according to their properties, can find application in, for example, adhesives, stoving paints, powdered paints, heat resistant varnishes, etc.

In the above-mentioned cases, the cross-linked polyesteramides alone is employed, whereas the polyesteramides after being incorporated for example with reinforcements and/or fillers can be used, as well.

As the reinforcements, fibrous reinforcements which are useful for ordinary plastics are preferable. As specific examples of such reinforcements, there may be mentioned inorganic fibers such as glass fibers, carbon fibers, quartz fibers, ceramic fibers, zirconia fibers, boron fibers, tungsten fibers, molybdenum fibers, steel fibers, berylium fibers, stainless steel fibers and asbestos fibers, natural fibers such as cotton, flax, hemp, jute and sisal hemp, and synthetic fibers having superior heat resistance such as polyamide fibers, nylon fibers and polyester fibers. In order to improve adhesion toward the thermosetting resin, fibrous reinforcements having the surface of fibers treated with, for example, chromium compounds, silane, vinyltriethoxysilane and aminosilane may be used. These fibrous reinforcements can be employed alone or in combination of not less than two kinds thereof. The above fibrous reinforcements can be utilized in the forms processed in various commercial products such as braids, mats, fabrics, tape and short fibers cut to a uniform length. These may be used either solely or in the composite form of combinations of not less than two kinds thereof. The content of the reinforcements can be arbitrarily selected, depending upon the viscosity of resin composition, type of reinforcements, shape of finished product and characteristics desired as composite material, etc., and normally, is in the range of about 3 to 95 weight %, preferably about 5 to 80 weight %.

Examples of the fillers include oxides (e.g., silica, alumina, titanium dioxide, etc.), hydroxides (e.g., aluminum hydroxide, etc.), carbonates (e.g., calcium carbonate, magnesium carbonate, etc.), silicates (e.g., talc, clay, glass beads, bentonite, etc.), carbon (e.g., carbon black, etc.), metal powder (e.g., iron powder, aluminum powder, etc.), and so forth.

The amount of the fillers is in the range of about 3 to 95 weight %, preferably about 10 to 80 weight %.

The resin composition of this invention may contain, in addition to the above-mentioned reinforcements and fillers, stabilizers, internal mold-releasing agents, pigments, fire retardants and the like which are used in ordinary thermosetting resin molding materials.

As the specific method of manufacturing the resin composition of this invention, by way of example, there may be mentioned a procedure which comprises mixing or impregnating a mixed system of a bis(3-oxazoline) compound, dicarboxylic acid and catalyst with reinforcements and/or fillers.

With reference to the mixing or impregnation of the mixed system with reinforcements, especially fibrous reinforcements, various known procedures usable in the production of composite materials of cross-linked polyesteramides and glass fibers can be adopted.

More concretely, there may be mentioned a variety of procedures such as (1) a procedure which comprises injecting for impregnation a resin raw material on a fibrous reinforcement placed in advance in the mold for heat and pressure forming, followed by effecting a cure under heating (e.g., preform, matched metal die method, resin injection method, etc.), (2) a procedure which comprises mixing and kneading a resin raw material with a fibrous reinforcement cut to a uniform size, and charging or injecting the resulting mixture into the mold for heat and pressure forming, followed by effecting a cure under heating (e.g., bulk molding compound method, transfer method, injection molding method, R—RIM method, etc.), and (3) a procedure which comprises impregnating a fibrous reinforcement with a resin raw material to yield a tack-free prepreg molding material (e.g., SMC, prepreg cloth method, etc.).

When the resin composition of this invention is employed as a molding material, the molding temperature adopted is normally in the range of about 160° to about 230° C. The heat-curing time varies depending upon the kind and amount of catalyst, types of bis(2-oxazoline) compound and dicarboxylic acid, molding temperature, etc., and is in the range of about 1 minute to 1 hour.

The resin composition according to this invention can develop fully the characteristics retained by the reinforcements and/or fillers, and especially when fibrous materials are used as reinforcement, can provide the molding material having excellent mechanical properties, especially outstanding toughness, that cannot possibly be expected with conventional fiber-reinforced plastics and also exhibiting superior characteristics such as thermal properties.

The resin composition of this invention can find application not only in the application fields for conventional fiber-reinforced plastics, such as applications of space, aircraft, craft, railway vehicles, automobiles, civil engineering, construction and building, electrical and electronic appliances, anti-corrosion equipment, sporting and leisure goods, medical equipment and industrial parts, but also in the new application areas where conventional fiber-reinforced plastics have failed to achieve application development.

The examples and reference examples are described below to illustrate this invention more specifically.

EXAMPLE 1

Mixed were 184 g (0.85 mole) of 1,3-bis(2-oxazolinyl-2)benzene, 101 g (0.50 mole) of sebacic acid and 2.8 g of triphenyl phosphite, and the mixture was molten by heating at 130° C. and poured into a mold (cavity of 30 cm×25 cm×0.3 cm) warmed in advance at 200° C., followed by leaving on standing in an oven of 200° C. for 10 minutes to allow the mixture to polymerize and cure. After the mold was allowed to cool, it was opened and the cured mixture was taken out. With the resulting cast sheet, determination of physical properties was made, with the following values found: Tensile strength, 9 kgf/mm$^2$; elongation, 8%; tensile modulus, 310 kgf/mm$^2$; flexural strength, 14.5 kgf/mm$^2$; flexural modulus, 370 kgf/mm$^2$; thermal deflection temperature (under a load of 18.6 kg), 80° C.

Analysis of the cured material (1) 20 ml of 2N NaOH solution was added to 2.50 g of the powder obtained by pulverizing the cured material, and the mixture was warmed at 80° C. to decompose completely the cured material. After the mixture was made to 25 ml in whole volume with use of a volumetric flask, a part of the resulting mixture was subjected to gas chromatography (Shimadzu GC-7A; column, TENAX (R) 2 m; column temperature, 160° C. at the initial stage, raised at 150° C./min.) to conduct the quantitative determination of monoethanolamine. As a result, it was found that 52% of the monoethanolamine component contained in 1,3-bis(2-oxazolinyl-2)benzene was detected, or that the degree of cross-linking was 48%.

(2) The alkali decomposition solution as obtained under (1) was made acid and cooled, and white crystals which separated out were recovered by filtration to give 2.05 g of a mixture of isophthalic acid and sebacic acid (2.11 g; the theoretical value).

(3) The solution freed of the acid component was brought to pH 9 with N-NaOH solution and concentrated to about 30 ml, and 5.0 g of benzoyl chloride and 9 ml of 4N-NaOH solution were added to the concentrate for benzoylation of the amino and hydroxyl groups of ethanolamine and its derivatives contained therein. The oily portion was separated and dried to give 5.4 g of the benzoyl derivatives. A part of this was dissolved in tetrahydrofuran and subjected to high-speed gel permeation chromatography, with the chart of FIG. 1 obtained. (column; Shimadzu HSC-20×2, HSG-15×2, HSG-10×1, solvent; tetrahydrofuran, flow rate; 1 ml/min, pressure; 50 kg/cm$^2$; detection; absorption at 254 nm). Separately, the dibenzoyl derivative of ethanolamine and the tribenzoyl derivative of N-aminoethylethanolamine were synthesized and subjected to high-speed gel permeation chromatography, respectively. Determination of their individual count numbers indicated that the peak A as shown in FIG. 1 is the peak of the benzoyl derivative of ethanolamine and the peak B is the peak of the tribenzoyl derivative of N-aminoethylethanolamine. The several peaks which appeared regularly on the higher molecular weight side than the peak B are evidently attributed to the benzoyl derivatives of HOCH$_2$CH$_2$(NHCH$_2$CH$_2$)$_n$NH$_2$ (n=2,3,4, ... ).

EXAMPLE 2

Mixed were 36.8 g (0.17 mole) of 1,3-bis(2-oxazolinyl-2)benzene, 24.8 g (0.17 mole) of adipic acid and 0.43 g of tris(chlorophenyl) phosphite, and the mixture was placed in a mold, followed by warming. At the time when the internal temperature reached about 130° C., the mixture was completely molten, and when the internal temperature was raised to 170° C., it gelled. Thereafter, the temperature of the mold was raised to 200° C. and maintained at the same one for 15 minutes. After being allowed to cool, the cured material was taken out.

Quantitative determination of the degree of cross-linking

A part of the cured material was taken, and warmed in 4N-NaOH solution to hydrolyze, followed by subjecting to gas chromatography for quantitative determination of monoethanolamine. Calculation demonstrated that the residual ratio of monoethanolamine was 92.4% or that the degree of cross-linking was 7.6%.

EXAMPLE 3

Mixed were 138 g (0.64 mole) of 1,3-bis(2-oxozolinyl-2)benzene, 47 g (0.32 mole) of adipic acid and 1.85 g of triphenyl phosphite, and the mixture was warmed at 130° C. to be molten. The molten mixture was poured into a mold (space of 3 mm) heated in advance at 180° C., which was then placed in an oven at 180° C. for 30 minutes to allow the mixture to cure through polymerization. With the 3-mm thick cured sheet thus obtained, determination of physical properties was made, with the following values found: Tensile strength, 13.5 kgf/mm$^2$; elongation, 4.3%; tensile modulus, 460 kgf/mm$^2$; flexural strength, 21 kgf/mm$^2$; flexural modulus, 490 kgf/mm$^2$; thermal deflection temperature, 126° C. With use of a separate mold (space of 15 mm), there was obtained a cured material of the same composition, whose Izod impact strength as determined was 2.5 kg.cm/cm.

Quantitative determination of the degree of cross-linking

Determination of the content of monoethanolamine by the same procedure as in Example 2 indicated that the residual rate of monoethanolamine was 40.4%, and therefore that the degree of cross-linking was 59.6%.

EXAMPLE 4

Mixed were 54.1 g (0.025 mole) of 1,3-bis(2-oxazolinyl-2)benzene, 73.1 g (0.005 mole) of adipic acid and 0.31 g of triphenyl phosphite, and the mixture was poured into a mold warmed at 150° C. Thereafter, the temperature of the mold was raised to 180° C. and maintained at the same one for 20 minutes, whereby the mixture gelled. After heating was continued at 180° C. for 1 hour, the mold was allowed to cool, and a very hard cured material was obtained.

Determination of the degree of cross-linking

By the same procedure as in Example 2, the content of monoethanolamine was determined, and calculation indicated that the residual rate of monoethanolamine was 31% and therefore that the degree of cross-linking was 69%.

EXAMPLE 5

Mixed were 33.7 g of 1,4-bis(2-oxazolinyl-2)benzene, 27.6 g of dodecandioic acid and 0.6 g of triphenyl phosphite, and the mixture was heated. When the internal temperature reached a level in the vicinity of 150° C., the mixture was molten, and when the internal temperature was raised to 170° C., it gelled. After the bath temperature was maintained at 200° C. for 30 minutes, the mold was allowed to cool, thus yielding a clear yellow cured material.

A portion of the cured material was warmed in aqueous NaOH solution to decompose. Measurement of the content of monoethanolamine indicated that the residual rate of monoethanolamine was 75% and therefore that the degree of cross-linking was 25%.

EXAMPLE 6

A 23 g (0.106 mole) quantity of 1,3-bis(2-oxazolinyl-2)benzene and 11 g (0.058 mole) of azelaic acid were placed in a beaker and mixed, followed by warming at 130° C. to be molten. 66 g of alumina was added to it, and then 1.0 g of triphenyl phosphite was added. When the bath temperature was raised to 160° C., the mixture gelled 10 minutes later. After the same temperature was maintained for 30 minutes, the mold was allowed to cool to give a white cured material.

Measurement of the degree of cross-linking

The cured material was decomposed with an alkali. Determination of monoethanolamine indicated that the residual rate of monoethanolamine was 48.0%, and therefore that the degree of cross-linking was 52%.

EXAMPLE 7

Mixed were 40.4 g of 1,3-bis(2-oxazolinyl-2)benzene and 19.6 g of thiodipropionic acid, and the mixture was warmed at 110° C. to be molten. 60 g of silica was added little by little to the mixture, which was stirred to a uniform suspension. Then, 0.6 g of a solution of cadmium nitrate in 50% ethylene glycol was added to the suspension, and the mixture was stirred, followed by raising the bath temperature to 180° C. When the internal temperature reached 170° C., the whole mixture gelled. After it was maintained as such for 30 minutes, the mold was allowed to cool and opened to take out a cured material.

The cured material was a slightly transparent, white solid. A part of the cured material was taken, and hydrolyzed in an aqueous alkali solution. Measurement of the content of monoethanolamine indicated that its residual rate was 51.5%, and therefore that the degree of cross-linking was 48.5%.

EXAMPLE 8

Mixed were 51.9 g (0.24 mole) of 1,3-bis(2-oxazolinyl-2)benzene, 23.4 g (0.16 mole) of adipic acid and 1.5 g of tetrakis (2,4-di-t-butylphenyl) 4,4'-biphenylene diphosphonite, and the mixture was placed in a mold warmed at 140° C. Thereafter, the temperature of the mold was raised to 200° C. and maintained at the same one for 21 minutes, whereby the mixture gelled. After heating was continued for 33 minutes, the mold was allowed to cool, thus yielding a semitransparent yellow cured material.

Measurement of the degree of cross-linking

By the same procedure as in Example 2, the content of monoethanolamine was determined, and calculation indicated that the residual rate of monoethanolamine was 74% and therefore that the degree of cross-linking was 26%.

EXAMPLE 9

A 85 g (0.39 mole) quantity of 1,3-bis(2-oxazolinyl-2)benzene was placed in a flask, followed by warming at 180° C. to be molten. 15 g (0.09 mole) of isophthalic acid was added to it in the course of about 1 hour. Then the reaction mixture was cooled to 145° C. (hereinafter referred to the reaction mixture A).

A 25 g (0.116 mole) quantity of 1,3-bis(2-oxazolinyl-2)benzene, 74 g (0.514 mole) of adipic acid and 3 g of triphenyl phosphite were placed in another flask, followed by warming at 130° C. to be molten (hereinafter referred to the reaction mixture B).

The reaction mixture A was mixed with the reaction mixture B in a weight ratio of 7 to 3, and the mixture was poured into a mold warmed at 180° C. and maintained at the same temperature for 30 minutes, whereby the mixture gelled. A very hard cured material was obtained. No unmolten isophthalic acid was detected in the cured material.

Determination of the degree of cross-linking

By the same procedure as in Example 2, the content of monoethanolamine was determined, and calculation indicated that the residual rate of monoethanolamine was 58% and therefore that the degree of cross-linking was 42%.

The physical properties of the cured material are as follows.

| | |
|---|---|
| Flexural strength | 23.6 Kg/mm$^2$ |
| Flexural modulus | 470 Kg/mm$^2$ |
| Impact strength (DINSTAT) | 20 Kg · cm/cm$^2$ |
| Heat distortion temperature | 133° C. |
| Water absorption (23° C., 24 hr) | 0.50% |

EXAMPLE 10

80 g (0.370 mole) of 1,3-bis(2-oxazolinyl-2)benzene and 20 g (0.137 mole) of adipic acid were placed in a flask, followed by warming to be molten. 20 g of milled glass fibers were added to the molten material. The mixture was kept at 130° C. (hereinafter referred to the reaction mixture A).

43 g (0.199 mole) of 1,3-bis(2-oxazolinyl-2)benzene, 57 g (0.390 mole) of adipic acid, 3.3 g of triphenyl phosphite and 5 g of milled glass fibers were placed in another flask, followed by warming at 125° C. to be molten (hereinafter referred to the reaction mixture B).

The reaction mixture A was mixed with the reaction mixture B in a weight ratio of 7 to 3. The molar ratio of adipic acid/1,3-bis(2-oxazolinyl-2)benzene was 0.66. The mixture was degassed under reduced pressure and poured into a mold warmed at 200° C. and maintained at the same temperature for 30 minutes, whereby the mixture gelled. A cured bubble-free material was obtained.

Determination of the degree of cross-linking

By the same procedure as in Example 2, the content of monoethanolamine was determined, and calculation indicated that the residual rate of monoethanolamine was 65% and therefore that the degree of cross-linking was 35%.

EXAMPLE 11

9.19 kg (42.55 mole) of 1,3-bis(2-oxazolinyl-2)benzene and 1.31 kg (8.90 mole) of adipic acid were placed in a vessel equipped with a heater followed by warming at 140° C. to be molten(hereinafter referred to the reaction mixture A).

2.28 kg (10.55 mole) of 1,3-bis(2-oxazolinyl-2)benzene, 3.72 kg (25.48 mole) of adipic acid and 0.20 kg of triphenyl phosphite were placed in another vessel, followed by warming at 135° C. to be molten (hereinafter referred to the reaction mixture B).

The reaction mixtures A and B were simultaneously fed to a mold at the respective ratios of 700 g/min. and 300 g/min. The molar ratio of adipic acid/1,3-bis(2-oxazolinyl-2)benzene was 0.55. The mold was warmed at 200° C. and maintained at the same temperature for 20 minutes, whereby the mixture gelled. A very hard cured material was obtained.

Determination of the degree of cross-linking

By the same procedure as in Example 2, the content of monoethanolamine was determined, and calculation indicated that the residual rate of monoethanolamine was 52% and therefore that the degree of cross-linking was 48%.

EXAMPLE 12

11.52 kg (53.28 mole) of 1,3-bis(2-oxazolinyl-2)benzene, 2.88 kg (19.71 mole) and 0.072 kg of 2,6-di-t-butyl-p-cresol were placed in a vessel under nitrogen gas, followed by warming at 140° C. to be molten (hereinafter referred to the reaction mixture A).

2.175 kg (10.06 mole) of 1,3-bis(2-oxazolinyl-2)benzene, 2.825 kg (19.33 mole) of adipic acid and 0.125 kg of triphenyl phosphite were placed in another vessel, followed by warming at 135° C. to be molten (hereinafter referred to the reaction mixture B).

The reaction mixtures A and B were simultaneously fed to a vessel in a weight ratio of 8 to 2. The molar ratio of adipic acid/1,3-bis(2-oxazolinyl-2)benzene was 0.55. 7.5 kg of the mixture was poured into a cylindrical tube (outer diameter; 220 mm, inner diameter; 110 mm, height; 230 mm) and cooled to room temperature, followed by curing in an oven of 200° C. for 2 hrs. A cured bubble-free material was obtained.

Determination of the degree of cross-linking

By the same procedure as in Example 2, the content of monoethanolamine was determined, and calculation indicated that the residual rate of monoethanolamine was 48% and therefore that the degree of cross-linking was 52%.

EXAMPLE 13

75 g (0.347 mole) of 1,3-bis(2-oxazolinyl-2)benzene and 25 g of sebacic acid were placed in a flask, followed by warming at 135° C. to be molten (hereinafter referred to the reaction mixture A).

30 g (0.139 mole) of 1,3-bis(2-oxazolinyl-2)benzene, 70 g (0.346 mole) of sebacic acid and 1.7 g of triphenyl phosphite were placed in another flask, followed by warming at 130° C. to be molten (hereinafter referred to the reaction mixture B).

The reaction mixture A was mixed with the reaction mixture B in a weight ratio of 7 to 3. The molar ratio of sebacic acid/1,3-bis(2-oxazolinyl-2)benzene was 0.66. The mixture was poured into a mold warmed at 180° C. and maintained at the same temperature for 1 hr., whereby the mixture gelled. A very hard cured material was obtained.

Determination of the degree of cross-linking

By the same procedure as in Example 2, the content of monoethanolamine was determined, and calculation indicated that the residual rate of monoethanolamine was 67% and therefore that the degree of cross-linking was 33%.

EXAMPLE 14

In a stainless-steel beaker were weighed, and mixed thoroughly, 50 g of a polyester amide having an acid number of 5 and a reduced viscosity of 0.5 (0.5% cresol solution) formed from 1,4-bis(2-oxazolinyl-2)benzene, 1,3-bis(2-oxazolinyl-2)benzene, dodecanedioic acid and dimer acid (Versadyme ®288, produced by Japan Henkel Co. of Japan) and 10 g of 1,3-bis(2-oxazolinyl-2)benzene, and the mixture was held at 190° C. Then, 2.0 g of triphenyl phosphite was added to the mixture, followed by mixing. 5 minutes later, the mixture gelled to give an insoluble and infusible cured material.

APPLICATION EXAMPLE 1

The three components of Example 14 were mixed thoroughly at 150° C., and the mixture was held between two sheets of iron plate to accomplish bonding under the conditions of contact pressure, 200° C. and 30 minutes. Measurement of tensile shear adhesion was made at 23° C. and 80° C., respectively. For purpose of comparison, the same adhesion to be realized with the polyester amide alone was also determined.

|  | Tensile shear adhesion (kg/cm$^2$) | |
| --- | --- | --- |
|  | 23° C. | 80° C. |
| Example 14 | 162 | 73 |
| Polyester amide alone | 108 | 20 |

EXAMPLE 15

By reacting 133 g of dimer acid as used in Example 14 with 100 g of 1,3-bis(2-oxazolinyl-2)benzene at 190° C. for 1 hour, there was obtained a polyester amide oligomer having oxazoline rings at the terminals. 50 g of a polyester amide showing an acid number of 8 and a reduced viscosity of 0.45 formed from 20 g of the oxazoline oligomer derived from the reaction, 1,4-bis(2-oxazolinyl-2)benzene, 1,3-bis(2-oxazolinyl-2)benzene, dodecanedioic acid and dimer acid (Versadyme ®288) were weighed, and mixed thoroughly, in a reaction vessel, and the mixture was maintained at 190° C. Then, 1.5 g of triphenyl phosphite was added to the mixture, followed by mixing. 12 minutes later, the mixture gelled to give an insoluble and infusible cured material.

APPLICATION EXAMPLE 2

The three components as used in Example 15 were mixed in advance, and the mixture was held between two sheets each of steel plate and aluminum plate, separately, to accomplish bonding under the conditions of contact pressure, 200° C. and 30 minutes. With the aluminum plate, peeling-off adhesion was determined, whereas the steel plate test specimen was attached by suspension with a weight of the given load (500 g) and allowed to stand in an oven maintained at a constant temperature to determine the heat resistance by checking the temperature at which the bonded portion peeled off.

|  | Peeling-off adhesion | Heat resistance |
|---|---|---|
| Example 15 | 15 kg/25 mm | Not less than 250° C. |
| Polyester amide alone | 6 kg/25 mm | 120° C. |

EXAMPLE 16

In a reaction vessel at 190° C. were weighed, and mixed, 25 g of a dimer-acid based polyamide having a softening point of 140° C. and a reduced viscosity of 0.38, 5 g of 1,3-bis(2-oxazolinyl-2)benzene and 1.0 g of bisphenol A pentaerythritol phosphite. Eight minutes later, the mixture gelled to give an insoluble and infusible cured material.

EXAMPLE 17

In a reaction vessel at 190° C. were weighed, and mixed, 20 g of a copolymer nylon (Amilan ® CM-842-P; Toray Industries Inc. of Japan), 0.5 g of 1,3-bis(2-oxazolinyl-2)benzene and 0.6 g of triphenyl phosphite. One minute and 30 seconds later, the mixture gelled to give an insoluble and infusible cured material.

EXAMPLE 18

By reacting 65 g of dimer acid (Empol ®1024, produced by Emery & Co. of U.S.A.) with 50 g of 1,3-bis(2-oxazolinyl-2)benzene at 200° C. for 30 minutes, there was obtained a polyester amide having oxazoline at the terminals. Three g of the oxazoline oligomer derived from the reaction and 30 g of nylon 6 were weighed, and mixed thoroughly, in a stainless-steel reaction vessel, and the mixture was maintained at 260° C. Then, 1.2 g of bisphenol A pentaerythritol phosphite was added. The mixture gelled 45 seconds later to give an insoluble and infusible cured material.

EXAMPLE 19

In a reaction vessel were weighed, and mixed thoroughly, 30 g of nylon 12 and 2 g of 1,4-bis(2-oxazolinyl-2)benzene, and the mixture was maintained at 205° C. Then 0.9 g of tris(nonylphenyl) phosphite was added to the mixture, followed by mixing. Two minutes and 30 seconds later, the mixture gelled to give an insoluble and infusible cured material.

EXAMPLE 20

Combined were 30 g of powdered nylon 11 and 3 g of 1,4-bis(2-oxazolinyl-2)benzene, and the mixture was placed in a stainless-steel beaker, and warmed to maintain the internal temperature at 200° C. for 1 hour. The contents were once molten, and then gelled slowly. By this procedure, there was obtained the cross-linked nylon 11 which did not show a melting point and was insoluble in m-cresol.

REFERENCE EXAMPLE 1

In a stainless-steel beaker was placed 30 g of powdered nylon 11, and warming was effected to maintain the internal temperature at 200° C. for 1 hour, whereby the contents remained molten. After cooling, a part of the contents was taken out and added to m-cresol, resulting in complete dissolution. In other words, nylon 11 remained a linear polymer.

EXAMPLE 21

A 69 g quantity (1 mole) of 1,3-bis(2-oxazolinyl-2)benzene, 31 g (0.67 mole) of adipic acid and 1 g (1 weight % against the sum of 1,3-bis(2-oxazolinyl-2)benzene and adipic acid) of triphenyl phosphite were mixed thoroughly in a mortar, and the mixture was warmed at about 130° C. to be molten. The mixture showed a viscosity of 120 cps (B type viscosimeter, Rotor No. 2). One sheet each of a polyester mold-releasing film and a glass chopped strand mat EM-450(JIS R 3411) were fitted on a hot plate heated at 120° to 130° C., and the resin was poured on it. With use of an aluminum-made degassing roller for lamination, degassing was carried out while the glass chopped strand mat was impregnated uniformly with the resin. After impregnation and degassing, the resin-impregnated mat was covered with polyester mold-releasing film, followed by allowing to cool. After cooling, the glass chopped strand mat impregnated with the resin was almost tack-free. The polyester mold-releasing films which covered both of the surfaces of the glass chopped strand mat impregnated with the resin were removed, and the resin-impregnated mat was laid to four layers, held between plate molds heated at about 200° C., and cured with heat and pressure to form a flat sheet with about 3 mm of thickness, whereby an ordinary silicone-based mold release agent was applied on the surface of the mold, with the heating and pressure applying time being about 20 minutes and pressure about 20 kg/cm². A test specimen was cut out of the formed flat sheet and subjected to measurement of physical properties. Tensile strength, flexural strength, flexural modulus and load deflection temperature were determined in accordance with the method of JIS K 6911, and tensile modulus and tensile elongation were measured in accordance with the method of JIS K 7113, while the content of resin in accordance with the procedure of JIS K 6919.

A part of the formed product was warmed in an aqueous NaOH solution to decompose, and the solution freed of glass fibers was subjected to gas chromatography. Determination of the content of monoethanolamine indicated that the residual rate of monoethanolamine was 62.0% and therefore that the degree of cross-linking was 38.0%.

REFERENCE EXAMPLE 2

To an isophthalic-acid based unsaturated polyester resin (Polymal ® 6702, produced by Takeda Chemical Industries of Japan) were added 0.4% of 3% cobalt naphthenate, 0.7% of methyl ethyl ketone peroxide and 0.5% of B.P.O paste, and the mixture was impregnated into four layers of glass chopped strand mat EM-450, followed by degassing. Heat curing at 70° to 80° C.×30 min. and then at 120° C.×2 hours was effected, while compressing with heated plates, to form a flat sheet with about 3 mm of thickness. By the same procedures as in Example 21, its physical properties were measured.

The results of Example 21 and Reference Example 2 are shown in Table 1, along with the physical properties of the cast sheet being given as well.

EXAMPLE 22/REFERENCE EXAMPLE 3

By following the same procedures as in Example 21 and Reference Example 2, flat sheets were formed with use of the resins of the same compositions, except that glass plain-woven cloth MG253A (Asahi Fiber Glass Co., Ltd. of Japan) was used in 12 layers in place of the glass chopped strand mat.

EXAMPLE 23

By following the same procedure as in Example 21, a flat sheet was formed with the use of the resin of the same composition, except that carbon fiber plain-woven cloth #3101 (Toho Rayon Co., Ltd. of Japan) was employed in 12 layers in place of the glass chopped strand mat.

The resin content was determined by immersing a test specimen in nitric acid to remove by decomposition the resin and weighing the resulting residue.

The results of Examples 22 and 23 and Reference Example 3 as described above are shown in Table 2.

wherein R and R' each are a bivalent hydrocarbon radical; n is a positive integer and produced by the reaction of a bis(2-oxazoline) compound and a dicarboxylic acid wherein at least 5% of the —NH— groups are cross-linked with the bis(2-oxazoline) ring compound by a ring-opening addition reaction.

2. A moldable cross-linked polyesteramide claimed in claim 1, wherein the bivalent hydrocarbon radical represented by R is a phenylene group.

3. A moldable cross-linked polyesteramide claimed in claim 1, wherein the bivalent hydrocarbon radical represented by R' is an aliphatic dicarboxylic acid residue.

4. A moldable cross-linked polyesteramide claimed in claim 1, wherein the degree of the cross-linking is in the range of about 15 to 75%.

5. A process for producing a moldable cross-linked

TABLE 1

| Item | Example 21 | | Reference Example 2 | |
|---|---|---|---|---|
| Composition: | | | | |
| Bis(2-oxazoline) compound | 1,3-bis(2-oxazolinyl-2)benzene; 1 mole | 1,3-bis(2-oxazolinyl-2)benzene; 1 mole | Isophthalic-acid based unsaturated polyester resin (Polymal 6702) | Isophthalic-acid based unsaturated polyester resin (Polymal 6702) |
| Dicarboxylic acid | Adipic acid; 0.67 mole | Adipic acid; 0.67 mole | | |
| Catalyst | Triphenyl phosphite; 1 weight % | Triphenyl phosphite; 1 weight % | | |
| Fibrous reinforcement | | Glass chopped strand mat EM-450; four layers | | Class chopped strand mat EM-450; four layers |
| Physical properties: | | | | |
| Resin content, weight % | 100 | 74.8 | 100 | 69.0 |
| Tensile strength, kg/mm² | 11.6 | 17.8 | 4.8 | 11.2 |
| Tensile modulus, kg/mm² | 410 | 840 | 390 | 900 |
| Tensile elongation, % | 5.2 | 2.83 | 1.80 | 1.51 |
| Flexural strength, kg/mm² | 18.8 | 22.2 | 10.4 | 19.0 |
| Flexural modulus, kg/mm² | 440 | 800 | 390 | 880 |
| Load deflection temperature, 18.5 kg/cm² | 93 | >200 | 94 | >200 |

TABLE 2

| Item | Example 22 | Example 23 | Reference Example 3 |
|---|---|---|---|
| Composition: | | | |
| Bis(2-oxazoline) compound | 1,3-bis(2-oxazolinyl-2)-benzene; 1 mole | 1,3-bis(2-oxazolinyl-2)benzene; 0.67 mole | Isophthalic-acid based unsaturated polyester resin (Polymal 6702) |
| Dicarboxylic acid | Adipic acid; 0.67 mole | Adipic acid; 0.67 mole | |
| Catalyst | Triphenyl phosphite; 1 weight % | Triphenyl phosphite; 1 weight % | |
| Fibrous reinforcement | Glass plain-woven cloth MG 253 A; 12 layers | Carbon fiber plain-woven cloth #3101; 12 layers | Glass plain-woven cloth MG 253 A; 12 layers |
| Physical properties: | | | |
| Resin content, weight % | 51.8 | 37.3 | 50.0 |
| Tensile strength, kg/mm² | 28.7 | 86.5 | 24.1 |
| Tensile modulus, kg/mm² | 2100 | 5680 | 2000 |
| Tensile elongation, % | 2.40 | 1.49 | 1.50 |
| Flexural strength, kg/mm² | 38.8 | 87.6 | 35.0 |
| Flexural modulus, kg/mm² | 1800 | 5220 | 1750 |
| Load deflection temperature, 18.5 kg/cm² | >200 | >200 | >200 |

What is claimed is:

1. A moldable cross-linked polyesteramide having the repeating unit structure of the formula:

polyesteramide having the repeating unit structure of the formula:

wherein R and R' each are a bivalent hydrocarbon radical; n is a positive integer wherein at least 5% of the —NH— groups are cross-linked with the bis(2-oxazoline) ring compound by a ring-opening addition reaction, which comprises reacting a bis(2-oxazoline) compound represented by the formula:

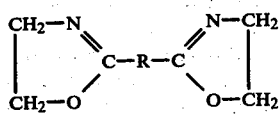

wherein R is a bivalent hydrocarbon radical, with a dicarboxylic acid represented by the formula:

wherein R' is a bivalent hydrocarbon radical in contact with an electrophilic reagent catalyst.

6. A process for producing a moldable cross-linked polyesteramide claimed in claim 5, wherein the bivalent hydrocarbon radical represented by R is a phenylene group.

7. A process for producing a moldable cross-linked polyesteramide claimed in claim 5, wherein the catalyst is a phosphorous acid ester containing phenolate or substituted phenolate groups.

8. A process for producing a moldable cross-linked polyesteramide claimed in claim 5, wherein the amount of the dicarboxylic acid is not more than about 1 mole per 1 mole of the bis(2-oxazoline) compound.

9. A process for producing a moldable cross-linked polyesteramide claimed in claim 7, wherein the phosphorous acid ester is triphenyl phosphite.

10. A resin composition comprising a moldable cross-linked polyesteramide having the repeating unit structure of the formula:

wherein R and R' each are a bivalent hydrocarbon radical; n is a positive integer and produced by the reaction of a bis(2-oxazoline) compound and a dicarboxylic acid wherein at least 5% of the —NH— groups are crosslinked with the bis(2-oxazoline) ring compound by a ring-opening addition reaction and about 3 to 95 weight % of at least one member selected from the group consisting of a reinforcement and a filler.

11. A resin composition claimed in claim 10, wherein the bivalent hydrocarbon radical represented by R is a phenylene group.

12. A resin composition claimed in claim 10, wherein the degree of cross-linking of the cross-linked polyesteramide is in the range of about 15 to 75%.

13. A resin composition claimed in claim 10, wherein the content of the reinforcements is in the range of about 5 to 80 weight %.

14. A resin composition claimed in claim 10, wherein the content of the fillers is in the range of about 10 to 80 weight %.

* * * * *